D. M. CUMMINGS & A. HAYES.
MACHINE FOR DRYING FLANNEL AND OTHER CLOTHS.

No. 44,402. Patented Sept. 27, 1864.

UNITED STATES PATENT OFFICE.

DANIEL M. CUMMINGS AND ALLEN HAYES, OF ENFIELD, NEW HAMPSHIRE.

IMPROVEMENT IN MACHINE FOR DRYING FLANNEL AND OTHER CLOTHS.

Specification forming part of Letters Patent No. 44,402, dated September 27, 1864.

*To all whom it may concern:*

Be it known that we, DANIEL M. CUMMINGS and ALLEN HAYES, both of Enfield, in the county of Grafton and State of New Hampshire, have invented an Improved Apparatus for Drying Cloth; and we do hereby declare the following to be a full, clear, and exact description thereof, reference being had to the accompanying drawings, forming a part of this specification, in which—

Figure 1:
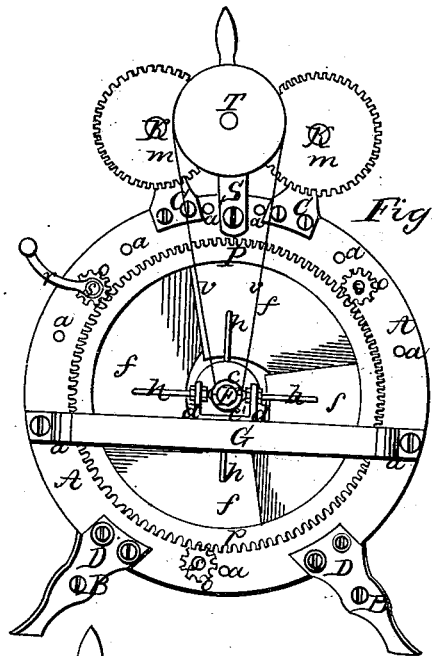
Figure 3:
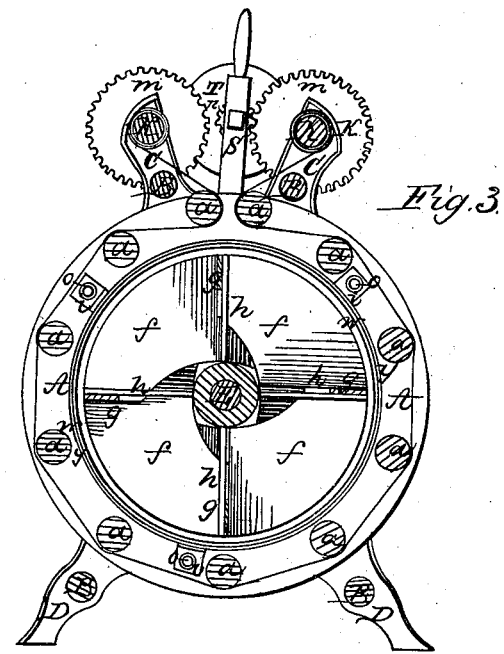
Figure 2:
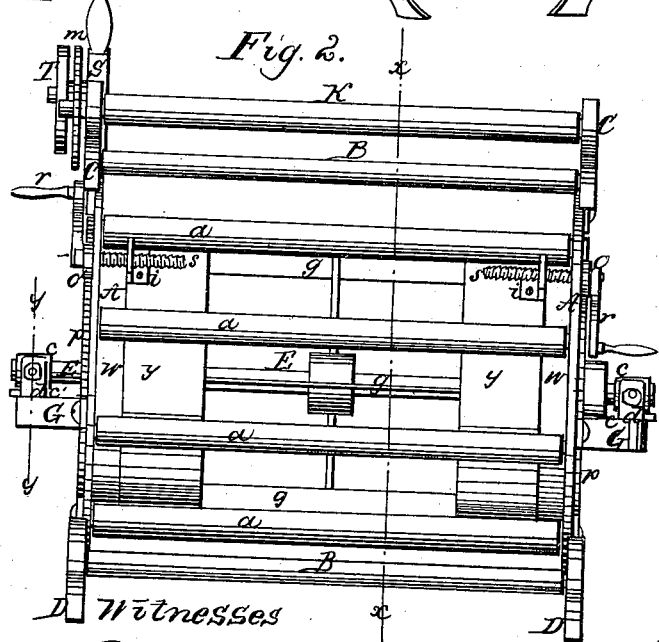
Figure 4:
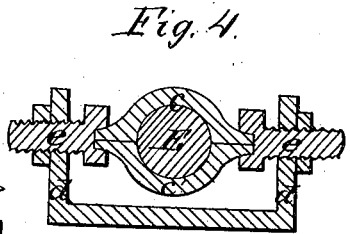

Figure 1 is an end elevation, and Fig. 2 a side elevation, of our improved apparatus; Fig. 3, a vertical section in the line $x\,x$ of Fig. 2; and Fig. 4 a detached sectional view in the line $y\,y$ of Fig. 2, showing the adjustable journal-box in which the fan-shaft revolves.

Similar letters of reference indicate corresponding parts in the several figures.

It is well known that flannel cloths and other fabrics are much softer and more pliable in their texture when dried by a current of cold air than when dried by means of steam or hot air.

Our invention relates to the construction of a machine which can be successfully used in drying cloths by means of a powerful draft of cold air, and may be described as follows:

Our improved cloth-drying machine consists of an open cylindrical frame, formed of a series of small rollers, $a\,a\,a\,a$, pivoted at either end in bearing apertures pierced in the parallel annular heads A A in circles concentric with the peripheries thereof. These annular heads A A, which constitute the ends of the machine, are supported and secured in their proper positions by means of the longitudinal brace-rods B B B B, Figs. 2 and 3, fitted between the arms C C, projecting from the upper portions, and the feet or supports D D, secured to the lower portions of these annular heads. A revolving shaft, E, extends horizontally through the center of this cylindrical drying-frame. The ends of this shaft turn in adjustable journal-boxes $c\,c'\,c\,c'$, supported between low standards, $d\,d$, erected upon the outwardly-curved bars G G, secured horizontally across the ends of the frame, as clearly illustrated in Fig. 1. Each journal-box is made in two semi-cylindrical halves, $c\,c'$, which embrace and fit closely over the journal, as illustrated in the detached view, Fig. 4. Conical pointed pivots project outwardly at opposite points of the circumference of the journal-box in the center of its length, immediately upon the line of separation of its two sections, so that the pivots are also divided. The pivots are embraced by conical recesses formed in the heads of set-screws $e\,e$, which project from standards $d\,d$, erected upon the supporting-bars G G, and the two divisions of the box are thus held together upon the journal. The heads of the set-screws are made angular, so as to be readily caught by a wrench, and by loosening one screw and tightening that opposite the position of the journal-box is readily adjusted, while by unscrewing both screws the boxes are at once loosened, to be taken apart and removed at pleasure. The shaft E, thus supported immediately in the center of the drying-frame so as to extend along its axis, is fitted with screw fan-blades $f\,f\,f\,f$, Figs. 1 and 2, placed within the frame close to the inner face of each end thereof, and so arranged as by their revolution to draw air inwardly, and also furnished with longitudinal floats $g\,g\,g\,g$, Fig. 2, extending across between the ends of the blades $f\,f\,f\,f$ on lines parallel to the shaft E, and which serve to agitate and expel centrifugally the air drawn into the machine by these screw-blades. The screw-blades $f\,f\,f\,f$ and floats $g\,g\,g\,g$, are supported and secured to the revolving shaft E by means of suitable arms $h\,h\,h\,h$.

The cloth to be dried is fed to the machine over auxiliary rollers K K, Figs. 1, 2, and 3, pivoted between the upper ends of the arms C C. The feed-rollers are fitted at one end with toothed wheels $m\,m$, and motion is communicated directly to the one roller or the other at pleasure by means of a shipper-lever, S, Figs. 1 and 3, arranged between the toothed wheels $m\,m$, upon which is secured the pulley T and pinion $n$, arranged to gear into either one of the toothed wheels $m\,m$ with which it may be thrown into contact. This pulley is driven by means of a band connecting the same with the fan-shaft E.

In order to accommodate the machine to varying widths of cloth, so that, whether the piece be broad or narrow, the air shall be forced out along its entire breadth without escaping at the sides, we have secured firmly against the inner face of the heads and within the circle of rollers two inwardly-projecting cylindrical rims or bands, w w, upon which are placed movable bands or rings y y, which slide backward and forward on the same.

The open space left between the edges of the inwardly-projecting bands or rims w w is equal to the utmost width of any cloth to be dried on the frame, and by drawing the sliding bands y y entirely back upon the stationary rims w w this whole interval in the cylindrical frame is left uncovered to receive the wide cloth; but by sliding out the movable bands on either side this space may be contracted to accommodate the narrowest cloth to be brought over it.

The movable bands y y are made to slide backward and forward by means of a series of set-screws, s s s, Figs. 1 and 2, arranged around the annular heads A A. The blank portion of these screws turn loosely in suitable apertures pierced in the heads of the frame, and their ends screw into lugs i i, formed upon the perimeters of the sliding bands y y. Upon the head of each screw is secured a small pinion, o, Fig. 1, gearing into a toothed ring, p, which is fitted upon the outer face of each end of the frame, and by means of which the revolution of any one of the set-screws upon a given end of the machine will be communicated equally to all upon that end. Hence, by turning one of the set-screws by a crank, r, the toothed ring p is made to revolve, and turn thereby all the remaining set-screws with a precisely similar motion. By this device the power necessary to move the bands y y is applied to several points of the circumference at the same moment and with equal force.

The end of the piece of cloth to be dried is first carried over one of the auxiliary rollers K, and then around the machine over the stretching-rollers, which form the drying-cylinder frame, and it is finally wound around the auxiliary roller on the opposite side. This auxiliary roller is thrown into gear with the fan-shaft E by means of the shipper-lever S, toothed wheels m and n, and a suitable band, r, Fig. 1, and by its revolution gradually draws the cloth forward over the machine. The wind vent in the machine is then adjusted by means of the sliding rings y y, so as to coincide with the width of the cloth, and, the shaft being put in motion, currents of air are drawn in at the ends of the frame and then forced out radially through the cloth in a strong powerful blast. The floats g g g g upon the fan-wheel, by agitating the cloth in their revolutions, not only facilitate the drying thereof, but also render it more compact in texture by working up the loose fibers and causing them to fill the interstices between the threads.

If the fabric be not sufficiently dried after having passed once around the machine, the receiving-roller may be released and the feed-roller thrown into gear with the fan-shaft by a movement of the shipper-lever, and made to revolve, so as to draw the cloth back over the machine a second time. Thus the cloth may be passed and repassed over the machine by simply throwing one or the other of the auxiliary rollers into gear and thereby reversing their movement.

It will be observed, as an advantage in this improved drying-machine, that there are no hooks or catches connected with it to tear or pull the edges of the cloth in drying.

Having thus fully and clearly described our improved cloth-drying apparatus, what we claim therein as new, and desire to secure by Letters Patent, is—

1. The combination of a series of parallel stretching-rollers, a a a a, with one or more central fans, in a cloth-drying machine, when said rollers are arranged and combined substantially in the manner and for the purpose herein represented and described.

2. The use of annular slides y y, or their equivalents, when interposed between and combined with one or more revolving fans and a series of stretching-rollers a a a a, in a cloth-drying machine, to control the current of air from such fans, substantially in the manner and for the purpose herein set forth.

3. The combination of a toothed ring, p, or its equivalent, with the pinions o o and set-screws s s, to secure the simultaneous movement of the set-screws, substantially in the manner and for the purpose herein set forth.

4. The combination, in a machine for drying cloth, of a bisected journal-box, c c', with either journal of a revolving shaft, E, when said journal-box is supported and adjusted and its two sections are held together and confined by means of cavities in the heads of opposite set-screws, embracing and confining the ends of pivots or lugs so formed upon the bisected journal-box as that each pivot shall be divided by the partition of said box, substantially in the manner and for the purpose herein set forth.

The foregoing specification of our improved apparatus for drying flannel, &c., signed by us this 7th day of June, 1864.

DANIEL M. CUMMINGS.
ALLEN HAYES.

In presence of—
WYMAN PATTEE,
JAMES F. PATTEE.